United States Patent [19]

Suganuma et al.

[11] 4,206,968
[45] Jun. 10, 1980

[54] OPTICAL FIBER AND METHOD FOR PRODUCING THE SAME

[75] Inventors: Tsuneo Suganuma, Tokorozawa; Gyozo Toda, Hino; Koji Ishida, Tokyo; Shin Satoh, Iruma; Toshio Katsuyama, Kokubunji; Mamoru Sugie, Hachioji, all of Japan

[73] Assignee: Hitachi, Ltd., Tokyo, Japan

[21] Appl. No.: 874,420

[22] Filed: Feb. 2, 1978

[30] Foreign Application Priority Data

Feb. 2, 1977 [JP] Japan .................................. 52-9665

[51] Int. Cl.² ............................................. G02B 5/14
[52] U.S. Cl. ............................... 350/96.33; 350/96.34
[58] Field of Search ........................ 350/96.33, 96.34; 65/3 A, DIG. 7

[56] References Cited

U.S. PATENT DOCUMENTS

| 4,114,980 | 9/1978 | Asam et al. ................. 350/96.33 |
| 4,125,388 | 11/1978 | Powers ........................ 65/DIG. 7 |

OTHER PUBLICATIONS

P. W. Black, "Fabrication of Optical Fiber Waveguides," Electrical Communication, vol. 51, No. 1, pp. 4–11, 1976.

J. B. MacChesney et al., "Preparation of Low Loss Optical Fibers . . ", 10th International Congress on Glass 1974, 6-40 to 6-45.

Primary Examiner—Rolf G. Hille
Attorney, Agent, or Firm—Craig & Antonelli

[57] ABSTRACT

A method for producing an optical fiber comprises (i) the step of depositing a barrier layer on the inner wall surface of a glass tube by the CVD (chemical vapor deposition) process, said barrier layer being capable of preventing the diffusion of impurities and being made of high-silica glass which has a refractive index that is substantially equal to that of the glass tube and which contains at least one substance for lowering the refractive index of silica and at least one substance for raising the refractive index of silica, (ii) the step of depositing a glass film of desired refractive index on the barrier layer by the CVD process, (iii) the step of heating and collapsing the resultant glass tube into a composite rod or the so-called optical fiber preform, and (iv) the step of heating and drawing said optical fiber preform into the optical fiber, whereby the optical fiber which has the impurity diffusion-preventing layer between the core and the outside glass layer can be easily produced.

12 Claims, 6 Drawing Figures

OPTICAL FIBER AND METHOD FOR PRODUCING THE SAME

BACKGROUND OF THE INVENTION

1. Field of the Invention

This invention relates to an optical fiber and a method for producing the same, and more particularly to an optical fiber of low transmission loss and a method for producing the same.

2. Brief Description of the Prior Art

The optical fiber which is the transmission medium of optical communication exhibits a low transmission loss. In order to produce the optical fiber of low transmission loss, impurities such as heavy metal ions and hydroxyl ions, which induce light absorption, must be prevented from mixing into the core part of the optical fiber, i.e. the inner portion, and the cladding part of the optical fiber, i.e. a portion located between the core part and the glass tube providing the outer portion of the optical fiber.

To this end, it has, heretofore, been common practice that an optical fiber preform is produced by a chemical vapor reaction employing a starting raw material of high purity and a carrier gas of high purity so as to prevent the mixing of the impurities from the raw material, and that a pure $SiO_2$ layer to serve as an impurity diffusion-preventing layer is provided between a glass tube and a cladding layer or that a thick cladding layer to function also as an impurity diffusion-preventing layer is provided between the glass tube and the core, whereby the diffusion of the impurities from within the glass tube or from outside it to the core part is prevented. In the former method of providing the pure $SiO_2$ layer, a high temperature of about 1,700° C. is required for the deposition of the $SiO_2$ layer. Unfavorably, the glass tube is subjected to deformation due to this high temperature. In the latter method of providing the thick cladding layer, it is necessary to make the thickness of the cladding layer about 10–15 μm. This leads to the difficulty that the structures of optical fibers, which can be fabricated, are restricted.

Known techniques related to this invention are described in Japanese Patent Application Laid-Open Specifications Nos. 48-73523, 50-120352, 50-51338 and 51-3650.

SUMMARY OF THE INVENTION

This invention has for its object to eliminate the difficulties of the prior art and to provide an optical fiber of low tranmission loss equipped with an impurity diffusion-preventing layer which is applicable to any structure of optical fibers and which can be formed by a chemical vapor reaction at a comparatively low temperature, as well as a method for producing the optical fiber.

In order to accomplish this object, the optical fiber according to this invention comprises a barrier layer between a "core" portion or the "cladding and core" portions of desired refractive index or desired index profile and an outside glass layer, the barrier layer being made of high-silica glass which has a refractive index that is substantially equal to that of the outside glass layer, which contains at least one substance for lowering the refractive index of silica and at least one substance for raising the refractive index of silica and which is formed by a chemical vapor reaction. The barrier layer serves to prevent impurities from diffusing from the glass tube forming the outer glass layer to the core part of the optical fiber.

Further, the optical fiber according to this invention is produced by a method of production comprising (i) the step of depositing a barrier layer on the inner wall surface of a glass tube by a chemical vapor reaction, the barrier layer being made of high-silica glass which contains at least one substance for lowering the refractive index of silica and at least one substance for raising the refractive index of silica and which has a refractive index that is substantially equal to that of the glass tube, (ii) the step of depositing at least one glass film of desired refractive index or desired index profile on said barrier layer by a chemical vapor reaction, the glass film or films serving as a "core" or "cladding and core" of the optical fiber, (iii) the step of heating and collapsing the resultant glass tube, to obtain an optical fiber preform in the shape of a composite rod, and (iv) the step of heating and drawing said optical fiber preform, to obtain the optical fiber.

As the glass tube referred to above, a silica tube or a Vycor tube is usually employed. Accordingly, the outside glass layer of the optical fiber obtained is made of fused silica or Vycor glass (product of Corning Glass Works in U.S.A.).

The concentrations of hydroxyl ions and total metallic ions in fused silica obtained commercially are, for example, 130 ppm and 8 ppm, respectively. However, the impurity concentrations of the outside glass layer are not restricted to those values.

Used as the substances for lowering the refractive index of silica are $B_2O_3$, fluorides (especially silicon compounds containing fluorine, e.g. $SiF_4$), etc. Used as the substances for raising the refractive index of silica are $GeO_2$, $P_2O_5$, $TiO_2$, $Al_2O_3$, etc. The contents in the high-silica glass, of the substances for lowering and raising the refractive index of silica, are such that the refractive index of the high-silica glass becomes substantially equal to that of the glass tube. The glass of the barrier layer contains the substances for lowering and raising the refractive index and $SiO_2$ being the main constituent, and it is a ternary system or multi-constituent system of high-silica glass. In general, the high-silica glass forming the barrier layer contains from 84 to 98% by weight of silica, from 1 to 15% by weight of at least one substance for lowering the refractive index of silica and 1 to 15% by weight of the at least one substance for increasing the refractive index of silica in the glass system. More preferably, the contents are 89~97, 2~10 and 1~5% by weight, respectively.

The chemical vapor reaction to be employed in this invention may be the CVD (chemical vapor deposition) process which is well known in the art. Any other method may well be adopted as long as it can deposit a glass layer of desired refractive index from a vapor onto the inner wall of a glass tube.

Although a proper temperature of the glass tube in the case of forming the barrier layer by chemical vapor reaction differs depending on the composition of the barrier layer, it is lower than the temperature necessary for forming an $SiO_2$ layer. Usually, the temperature in that case is made 1,500°–1,600° C. This corresponds to the temperature required for the densification of the deposited glass layer to become the barrier layer. At this extent of temperatures, the glass tube is not deformed.

Regarding the thickness of the barrier layer of the optical fiber obtained, a value of approximately 2.5 μm suffices, and even a value of about 2 μm is effective. Although the thickness may be made greater than 2.5 μm, the effect is not especially further enhanced.

It will be recognized that steps (ii), (iii) and (iv) are well known in prior art methods for producing optical fibers which use the MCVD technique.

With the optical fiber according to this invention, the quantity of diffusion of impurities, e.g. hydroxyl ions having been contained in the glass tube to the core part is very small, the transmission loss being therefore very low, the fiber structure can be freely chosen, and the production is easy. The method for producing an optical fiber according to this invention can readily produce an excellent optical fiber as described above.

BRIEF DESCRIPTION OF THE DRAWINGS

FIG. 3a is a diagram showing the refractive index profile of the section of an optical fiber in an embodiment of this invention, while

DESCRIPTION OF THE PRESENTLY PREFERRED EMBODIMENTS

Figure 1:
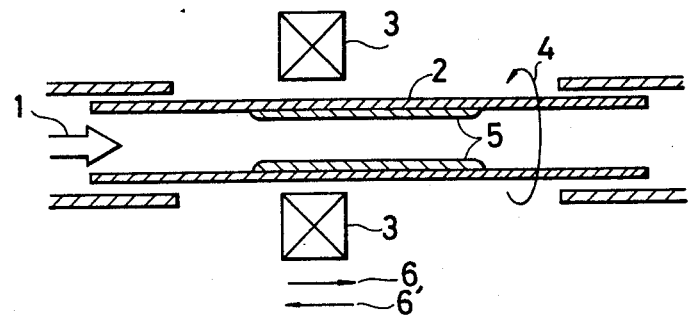
FIG. 1 is a schematic view for explaining the essential portions of an optical fiber producing apparatus which employs a chemical vapor reaction.

FIG. 1 is a view for explaining the essential portions of an optical fiber producing apparatus employing the MCVD technique which is a kind of chemical vapor reaction process.

As a glass tube 2, a silica tube having an outside diameter of 14 mm, a wall thickness of 1 mm and a total length of 120 cm is employed. The glass tube 2 is attached to a glass lathe, and while rotating the tube 2 at 40 r.p.m. in the direction of arrow 4, (or in the opposite direction), source gases for forming a glass layer are introduced thereinto in the direction of arrow 1. A heating sources 3 (electric oven, oxyhydrogen burner or the like) is moved in a reciprocal manner in the direction of arrow 6 or 6'. Thus, the glass layer 5 which includes a first impurity diffusion-preventing layer, a second cladding layer and a third core layer are sequentially deposited on the inner wall surface of the silica tube 2. In the present embodiment, the vapors of $SiCl_4$, $BBr_3$, $GeCl_4$ and $POCl_3$, as appropriately mixed with oxygen gas, are employed as the sources for forming the layers making-up the glass layer 5. The respective sources are received in the liquid state within bubblers held at 20° C.

In forming the impurity barrier layer, the source gases were bubbled by passing 384 cc/min of oxygen through $SiCl_4$, 288 cc/min of oxygen through $BBr_3$ and 140 cc/min of oxygen through $GeCl_4$. Further, 388 cc/min of oxygen was caused to separately flow as a carrier gas.

Figure 2:
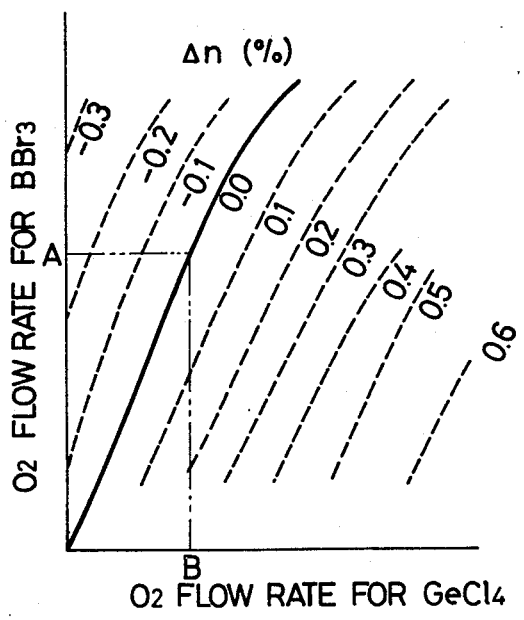
FIG. 2 is a graph for explaining the relationship between the composition of a raw material gas for a barrier layer and the refractive index of deposited glass.

The composition of the raw material gas in the case of forming the barrier layer, that is, the flow rates of oxygen to be passed through $SiCl_4$, $BBr_3$, $GeCl_4$ etc. can be determined by a preparatory experiment to be described now. The flow rate of oxygen through $SiCl_4$ is held constant at, for example, 384 cc/min, while the flow rates of oxygen through $BBr_3$ and through $GeCl_4$ are varied. Under these conditions, glass layers are deposited. The refractive indices of the glass layers are measured, and the relationship between the refractive index of the glass layer deposited in the glass tube and the respective flow rates of oxygen is illustrated with the refractive index being a parameter as in FIG. 2. In this figure, the axis of ordinates represents the flow rate of oxygen through $BBr_3$, and the axis of abscissas the flow rate of oxygen through $GeCl_4$. For each of curves, the difference $\Delta n\%$ between the refractive index of the deposited glass layer and that of the silica glass is written in addition. The axes of ordinates and abscissas are of arbitrary scale. With gas compositions corresponding to a curve (solid line) in which the refractive index difference with respect to the silica glass is zero in FIG. 2 (for example, when the flow rate of oxygen through $BBr_3$ is A and that through $GeCl_4$ is B), the refractive index of the barrier layer becomes equal to that of the glass tube (made of silica in this case), and the requisite of this invention is fulfilled. In the gas compositions corresponding to the curve of the refractive index difference of zero, one with which the temperature required for the densification of the deposited glass is 1,500°–1,600° C. is preferable. This is also obtained experimentally. Even when the compositions of the glass tube and the barrier layer are different from those described above, the conditions adopted in this invention can be similarly found out.

Using an oxyhydrogen burner as the heating source 3, the silica tube 2 was heated to 1,520° C. It was reciprocated 20 times. In this case, the moving speeds in the directions 6 and 6' were 4.0 mm/sec and 60 mm/sec, respectively. The heating temperature of the silica tube is determined by a well-known technique in accordance with the composition of the barrier layer. Any of the number of times of movement as well as the moving speed of the heating source and the rotating speed of the glass tube may be in a range set in accordance with well-known techniques which are employed for the glass layer deposition based on the CVD in the field of the technology of producing optical fibers.

In this way, $GeO_2 - B_2O_3 - SiO_2$ glass to serve as the barrier layer was deposited on the surface of the inner wall of the silica glass 2 to a thickness of about 196 μm. The difference (relative index difference) between the refractive index of the glass layer and that of silica was within ±0.02%, and both the refractive indices were substantially equal.

Subsequently, a glass film to serve as the cladding layer is formed. The source gases were bubbled by passing 240 cc/min of oxygen through $SiCl_4$ and 360 cc/min of oxygen through $BBr_3$. Separately, 200 cc/min of oxygen was caused to flow as a carrier gas. The oxyhydrogen burner as the heating source 3 was reciprocated 8 times, and the moving speeds in the directions 6 and 6' were 2.5 mm/sec and 60 mm/sec, respectively. In this way, $B_2O_3 - SiO_2$ glass as the glass film to become the cladding layer was deposited to a thickness of about 82 μm. The relative index difference between this glass and silica was 0.55%.

Further, a glass film to become the core is formed on the $B_2O_3-SiO_2$ glass film. The source gases were bubbled by passing 120 cc/min of oxygen through $SiCl_4$ and 120 cc/min of oxygen through $POCl_3$. Separately, 360 cc/min of oxygen was caused to flow as a carrier gas. The oxyhydrogen burner as the heating source 3 was reciprocated 36 times, and the moving speeds in the directions 6 and 6′ were 2.5 mm/sec and 60 mm/sec, respectively. In this way, $P_2O_5-SiO_2$ glass as the glass film to serve as the core was deposited to a thickness of about 232 μm. The relative index difference of this glass with respect to silica was 0.20%.

The depositing conditions of the glass film to become the cladding layer and the glass film to become the core (for example, the composition of the raw material gas, the heating temperature of the glass tube, the number of times of movement of the glass tube, the moving speeds of the glass tube, etc.) may be determined in accordance with techniques well-known in the technical field of the optical fiber production employing the CVD process.

Subsequently, the introduction of the reaction gases was stopped, and as is well-known in the field of the optical fiber producing technology, the resultant glass tube 2 was heated and collapsed into a preform for an optical fiber so that the cross section of the glass tube 2 formed with the various glass films on the inner wall surface by the chemical vapor reactions as previously stated might become perfectly solid. The preform thus fabricated was heated and drawn with an electric oven, and an optical fiber having an outside diameter of about 150 μm was obtained.

Figure 3A:
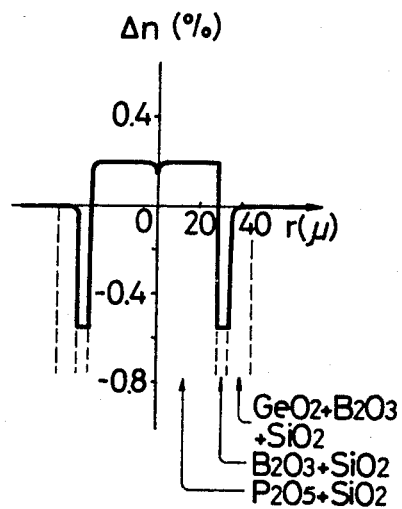
Figure 3B:
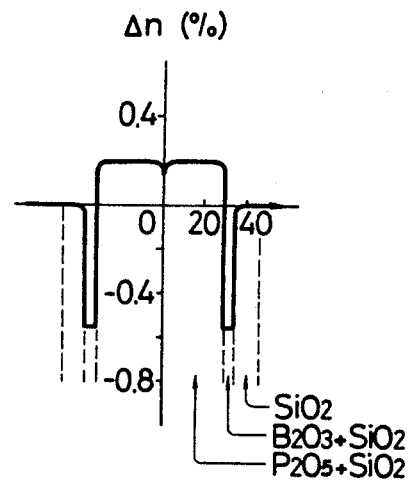
FIG. 3b is a diagram showing the refractive index profile of the section of an optical fiber in an example resulting from a prior art method.

The refractive index profile of a section of the optical fiber thus produced was measured with an interference micrometer. The resultant is shown in FIG. 3a. For the sake of comparison, the refractive index profile of a section of an optical fiber fabricated by a prior art method is shown in FIG. 3b. In FIGS. 3a and 3b, the axis of ordinates represents the relative index difference Δn(%) with respect to the silica glass, while the axis of abscissas represents the distance r (μm) from the center of the optical fiber. In each figure, the materials of glasses at respective positions of the optical fiber are written. Both the optical fibers have the socalled W type fiber structure.

Figure 4:
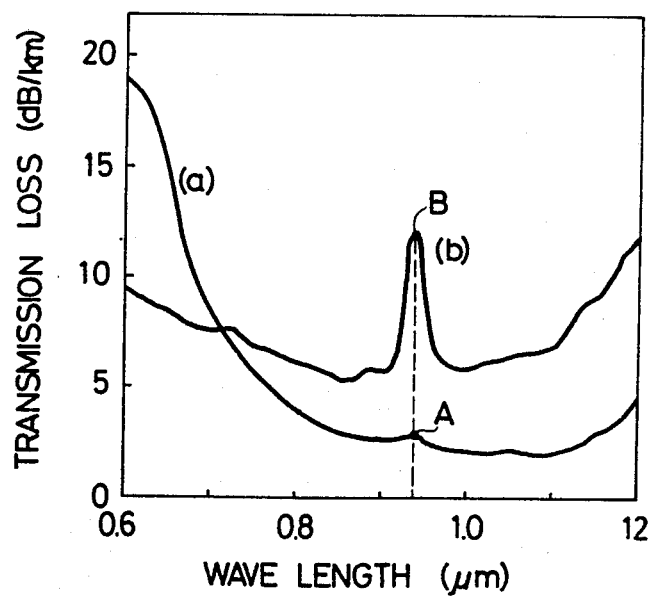
FIG. 4 is a diagram showing the loss spectra of optical fibers in an embodiment of this invention and an example of a prior art.

Measured results of the loss spectra of these optical fibers are illustrated in FIG. 4. Curves (a) and (b) in FIG. 4 correspond to the optical fibers shown in FIG. 3a and FIG. 3b, respectively. The peak B of the loss in the curve (b) of FIG. 4 is attributed to the diffusion of impurities, particularly hydroxyl ions, from silica employed for the glass tube. The corresponding peak A is very low in the curve (a) illustrative of the optical fiber according to this invention, and it is understood that the optical fiber of this invention is of low loss owing to the small quantity of diffusion. In the vicinity of a wavelength λ of 0.6 μm, the loss of the optical fiber shown by the curve (a) is high. This loss is considered to be ascribable to the drawing induced coloration, and can be removed by optimizing conditions for drawing the optical fiber. In FIG. 4, the axis of ordinates represents the transmission loss (dB/km), and the axis of abscissas the wavelength λ(μm).

Figure 5:
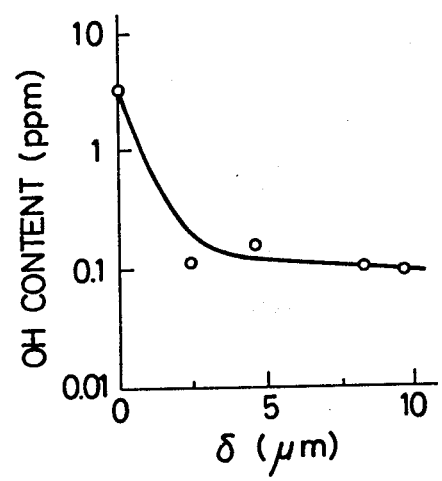
FIG. 5 is a diagram showing the relationship between the hydroxyl ion content of a core part and the thickness δ of a barrier layer at the time when, in an optical fiber of an embodiment of this invention, the thickness of a cladding layer was held constant and the thickness δ was varied.

FIG. 5 is a graph which shows hydroxyl ion contents in a core part at the time when, in the W type optical fiber of this invention to be produced as described above, the thickness of a cladding layer was held constant at 6 μm and the thickness δ of a barrier layer was varied. The axis of ordinates represents the hydroxyl ion content (ppm) in the core part, and the axis of abscissas the thickness δ (μm) of the barrier layer. As apparent from the figure, the content of hydroxyl ions in the core part decreases abruptly with increase in the thickness of the barrier layer, and it becomes substantially constant when the thickness of the barrier layer exceeds approximately 2.5 μm. According to this invention, therefore, the diffusion of the impurities to the core part can be sharply reduced by the barrier layer. As the thickness of the barrier layer, a value of at least 2.5 μm suffices, and even a value of approximately 2 μm brings forth an appreciable effect.

Whie, in the above embodiments, only the case of applying this invention to the W type optical fiber has been referred to, it is needless to say that the invention is also applicable to a stepped optical fiber and a graded index fiber.

The refractive indices of the respective glasses constituting the optical fiber according to this invention are as stated below.

Letting $n_1$ denote the refractive index of the glass forming the core (in case of the graded index fiber, the maximum value of the refractive index of the glass of the core), $n_2$ denotes the refractive index of the glass forming the cladding, $n_3$ denotes the refractive index of the glass forming the barrier layer, and $n_4$ the refractive index of the glass forming the outside glass layer, there are the relations of $n_1 > n_2$ and $n_3 \approx n_4 > n_2$ in case of an optical fiber having the cladding layer, and there is the relation of $n_1 > n_3 \approx n_4$ in case of an optical fiber having no cladding layer.

As set forth above, according to this invention, a dense barrier layer can be formed by a chemical vapor reaction at a comparatively low temperature, i.e. from 1,500° to 1,600° C. In addition, the invention can be applied to the production of any structure of optical fiber and can easily provide an optical fiber of very low transmission loss, i.e. 2 to 5 dB/km at the wave length of about 0.85 μm.

What is claimed is:

1. An optical fiber comprising a barrier layer between an outside glass layer and a core having a refractive index or an index profile as predetermined, said barrier layer exhibiting a refractive index substantially equal to that of said outside glass layer and being made of high-silica glass which contains at least one substance for lowering a refractive index of silica and at least one substance for raising the refractive index of silica and which is formed by a chemical vapor reaction.

2. A optical fiber as defined in claim 1, wherein at least one member selected from the group consisting of $B_2O_3$ and flourides of Si is employed as the substance for lowering the refrative index of silica, and at least one member selected from the group consisting of $GeO_2$, $P_2O_5$, $TiO_2$ and $Al_2O_3$ is employed as the substance for raising the refractive index of silica.

3. An optical fiber as defined in claim 1, wherein said chemical vapor reaction is the chemical vapor deposition process.

4. An optical fiber as defined in claim 1, wherein said barrier layer has a thickness of at least 2 μm.

5. An optical fiber as defined in claim 4, wherein the thickness of said barrier layer is at least 2.5 μm.

6. An optical fiber as defined in claim 1, wherein said outside glass layer is made of a glass selected from the group consisting of silica and Vycor glass.

7. An optical fiber comprising a barrier layer between an outside glass layer and a cladding and core having a refractive index or an index profile as predetermined, said barrier layer exhibiting a refractive index substantially equal to that of said outside glass layer and being made of high-silica glass which contains at least one substance for lowering a refractive index of silica and at least one substance for raising the refractive index of silica and which is formed by a chemical vapor reaction.

8. An optical fiber as defined in claim 7, wherein at least one member selected from the group consisting of $B_2O_3$ and fluorides of Si is employed as the substance for lowering the refractive index of silica, and at least one member selected from the group consisting of $GeO_2$, $P_2O_5$, $TiO_2$ and $Al_2O_3$ is employed as the substance for raising the refractive index of silica.

9. An optical fiber as defined in claim 7, wherein said chemical vapor reaction is the chemical vapor deposition process.

10. An optical fiber as defined in claim 7, wherein said barrier layer has a thickness of at least 2 $\mu$m.

11. An optical fiber as defined in claim 10, wherein the thickness of said barrier layer is at least 2.5 $\mu$m.

12. An optical fiber as defined in claim 7, wherein said outside glass layer is made of a glass selected from the group consisting of silica and Vycor glass.

* * * * *